CHENEY & KIMBALL.
Horse Hay Fork.
No. 84,477.
Patented Dec. 1, 1868.
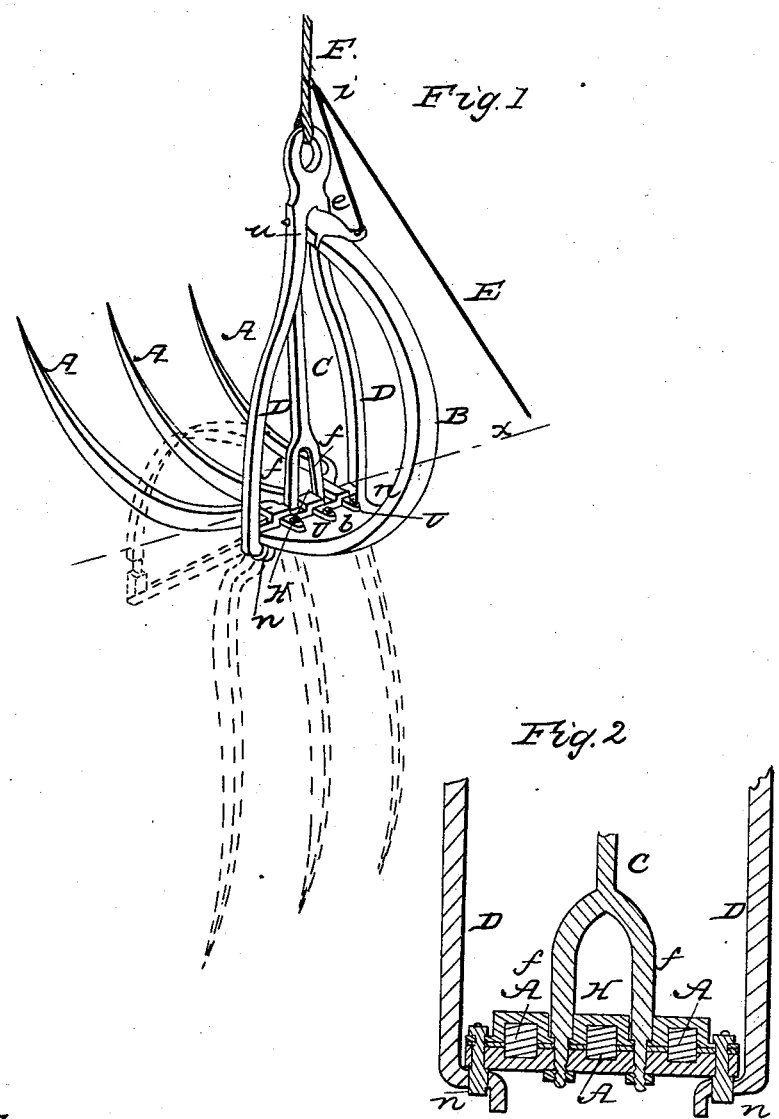
Witnesses
A. L. Nicholl
C. T. Cook
Inventors
Alonzo M. Cheney
Handley B. Kimball

United States Patent Office.

ALONZO M. CHENEY AND HANDLEY B. KIMBALL, OF CHARLOTTE, MICHIGAN.

Letters Patent No. 84,477, dated December 1, 1868.

IMPROVEMENT IN HORSE HAY-FORKS.

The Schedule referred to in these Letters Patent and making part of the same.

Be it known that we, ALONZO M. CHENEY, and HANDLEY B. KIMBALL, of Charlotte, Eaton county, Michigan, have invented certain new and useful Improvements in Horse Hay-Forks; and we do hereby declare the following to be a full and accurate description of the same, reference being had to the accompanying drawings, making a part of this specification, in which—

Figure 1 is a perspective view.

Figure 2 is a cross-section, on the line $x$, corresponding parts being indicated by similar letters.

Our fork consists of a bail, D, a stay-bar, C, a bent fork-shank, B, detachable tines, A A A, connected together by a corrugated clamping-bar, H, as hereinafter described, and operated by a hoisting-rope, F, and a catch-bar, $e$, and tripping-cord, E, as hereinafter described.

The bail D is provided with an eye at its upper extremity for the hoisting-rope F, and its lower extremities, D D, are pivoted, by eye-bolts $n\ n$, to the foot of the bent fork-shank B, as shown in fig. 2, so as to be underneath the load when the hay has been taken up on the tines, as hereinafter described.

The bent tines A A A are detachable, and the outer ones have a double bend, to enable them to take up a sufficient amount of hay.

The bent fork-shank B is made as light as is consistent with due strength, broadening at the lower extremity into a foot, $b$, as wide as need be for the attachment of the tines, &c., as hereafter described.

The stay-bar C is firmly secured at its upper extremity to the bent fork-shank B, and projects above it, so as to act as a stop against the bail permanently in one direction. It is forked at the lower extremity, the forks $f\ f$ being connected to the foot $b$ of the bent fork-shank B, as hereafter described.

The catch-bar $e$ is pivoted to the upper part of the bail D, as shown, and has side lips, $u\ u$, which engage in suitable grooves in the sides of the bent fork-shank B, to lock or unlock it, as required.

The tines A A A are fastened to the foot, $b$, of the bent fork-shank B by a corrugated clamping-bar, H, having rectangular grooves, and by steady-pins, $v\ v\ v$.

This clamping-bar is held securely over the overlapping ends of the tines by the eye-bolts $n\ n$ and the forks $f\ f$ of the stay-bar C, which are shouldered, threaded, and nutted, substantially as shown in fig. 2.

By this method of uniting the component parts of the fork, we get great rigidity at little expense of metal and labor, fasten the tines in a superior manner, and can remove them easily whenever necessary.

The fork is used thus: The operator holding the bent fork-shank B, plunges the fork-tines into the hay, when the fork being locked with the bail, the hoisting-rope is drawn, and the mass of hay confined in the angle bounded by the bail, stay-bar, and curved tines, as shown in the drawing, is lifted to its place in the mow; the catch-bar lips are raised out of their grooves by the tripping-cord, and the fork drops its load and assumes the position shown by the dotted lines in fig. 1.

Claims.

What we claim as our invention, and desire to secure by Letters Patent, is—

1. The bent fork-shank B, broadened at its lower extremity, $b$, for the connection of the bail, stay-bar C, and overlapping detachable tines A A A, substantially as described.

2. The pivoting of the bail D to the bent fork-shank B, so that the axis of revolution of the fork within the bail shall be underneath the load, substantially as described.

3. The attachment of the detachable bent fork-tines A A A to the bent fork-shank B, at the foot, $b$, by the corrugated clamping-bar H, fastened by the shouldered, threaded, and nutted eye-bolts $n\ n$, and forks of the stay-bar $f\ f$, substantially as described.

ALONZO M. CHENEY.
HANDLEY B. KIMBALL.

Witnesses:
A. L. NICHOLS,
C. T. COOK.